(12) United States Patent
Sen et al.

(10) Patent No.: US 7,546,484 B2
(45) Date of Patent: Jun. 9, 2009

(54) MANAGING BACKUP SOLUTIONS WITH LIGHT-WEIGHT STORAGE NODES

(75) Inventors: Vijay Sen, Bangalore (IN); Karandeep Singh Anand, Kirkland, WA (US); Vinay S. Badami, Hyderabad (IN); Sunil Pai, Hyderabad (IN); Charumathy Srinivasan, Andhra Pradesh (IN); Abid Ali, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 11/350,019

(22) Filed: Feb. 8, 2006

(65) Prior Publication Data

US 2007/0220320 A1    Sep. 20, 2007

(51) Int. Cl.
*G06F 11/00* (2006.01)
(52) U.S. Cl. .......................... 714/6; 709/221; 709/224
(58) Field of Classification Search ....... 714/6
See application file for complete search history.

(56) References Cited

U.S. PATENT DOCUMENTS

| | | | | |
|---|---|---|---|---|
| 6,704,885 | B1* | 3/2004 | Salas-Meza et al. | 714/6 |
| 6,799,258 | B1* | 9/2004 | Linde | 711/162 |
| 2005/0144518 | A1* | 6/2005 | Ricart et al. | 714/13 |
| 2006/0184652 | A1* | 8/2006 | Teodosiu et al. | 709/221 |
| 2006/0190775 | A1* | 8/2006 | Aggarwal et al. | 714/100 |
| 2006/0224642 | A1* | 10/2006 | Chandhok et al. | 707/204 |
| 2007/0061385 | A1* | 3/2007 | Clark et al. | 707/204 |
| 2007/0186127 | A1* | 8/2007 | Desai et al. | 714/13 |
| 2007/0198789 | A1* | 8/2007 | Clark et al. | 711/162 |
| 2008/0126845 | A1* | 5/2008 | Luo et al. | 714/6 |

OTHER PUBLICATIONS

LiveVault Corporation: LiveVault InSync Server Backup: How It Works [online] [retrieved on Jan. 23, 2006]. Retrieved from the Internet URL: http://www.livevault.com/solutions/smb/how__it__works.aspx#portal.
LiveVault Corporation: LiveVault InSync Oneline Backup and Recovery Service for Small and Medium Businesses [online][retrieved on Jan. 27, 2006]. Retrieved from the Internet URL: http://www.livevault.com/solutions/smb/datasheet.aspx.

(Continued)

*Primary Examiner*—Scott T Baderman
*Assistant Examiner*—Kamini Patel
(74) *Attorney, Agent, or Firm*—Workman Nydegger

(57) ABSTRACT

A backup system in accordance with an implementation of the present invention includes one or more light-weight (i.e., stateless) storage nodes that are positioned close enough to one or more assigned production servers to enable as rapid and efficient a data recovery as possible. The one or more light-weight storage nodes are driven by, and implement backup policies in accordance with, control settings determined by and received from a centralized backup server. Changes to the control settings are simply produced at the centralized backup server and propagated to each storage node in the system. In addition to efficient backup times, general backup administration can be greatly simplified at least in part since a large number of production serves can be serviced through a small or large number of light-weight storage nodes, which in turn can be managed by a single centralized backup server.

20 Claims, 4 Drawing Sheets

OTHER PUBLICATIONS

LiveVault Corporation: LiveVault InSync Service for Microsoft DPM [online] [retrieved on Jan. 27, 2006]. Retrieved from the Internet URL: http://www.livevault.com/solutions/smb/datasheetDPM.aspx.

InfoStor: Users Take Different Approaches to D2D [online][retrieved on Jan. 23, 2006]. Retrieved from the Internet URL: http://infostor.com/articles/article_display.cfm?Section=ARTCL&C=Newst&ARTICLE_ID=241666.

Network Appliance, Inc.: SnapMirror Software Global Data Availability and Disaster Recovery [online][retrieved on Jan. 23, 2006]. Retrieved from the Internet URL: http://www.netapp.com/products/software/snapmirror.html.

CommVault, Inc.: Commvault Simplifies Data Management for Small- and Medium-Size Businesses with HP [online][retrieved on Jan. 23, 2006]. Retrieved from the Internet URL: http://www.commvault.com/news_story.asp?id=241.

Microsoft Corporation: Overview of the Distributed File System Solution in Microsoft Windows Server 2003 R2 [online][retrieved on Jan. 23, 2006]. Retrieved from the Internet URL: http://technet2.microsoft.com/windowsServer/en/Library/d3afe6ee-3083-4950-a093-8ab748651b761033.mspx?pf=true.

* cited by examiner

MANAGING BACKUP SOLUTIONS WITH LIGHT-WEIGHT STORAGE NODES

CROSS-REFERENCE TO RELATED APPLICATIONS

N/A

BACKGROUND

Background and Relevant Art

As computerized systems have increased in popularity, so have the needs to store and backup electronic files and other communications created by the users and applications associated therewith. In general, computer systems and related devices create files for a variety of reasons, such as in the general case of creating a word processing document in a work setting, as well as creating a file used for more sophisticated database purposes. In addition, many of these documents can include valuable work product, or sensitive information that should be protected. One will appreciate, therefore, that there are a variety of reasons why an organization will want to backup electronic files on a regular basis, and thereby create a reliable restoration of an originally created file when needed.

One of the challenges facing organizations implementing one or more backup solutions there is often a need for backup solutions that are evermore complex and reliable. For example, an organization with growing data backup needs may find itself continually adding backup servers, storage media, and the like. Simply scaling protection needs in the backup system (such as by adding additional backup servers), however, can sometimes negatively affect the availability of any given backup (or backup server) in the system. This is due in part to the notion that each additional server may increase the administrative overhead on the backup infrastructure. This can also adversely impact availability since each backup server operates as an independent entity which can fail at any point.

For example, one conventional backup system uses a centralized backup server to receive data from one or more production servers. The centralized backup server (e.g., a Data Protection Manager—"DPM") is typically configured with several management applications and storage volumes for organizing, scheduling, and for controlling backups received from the various production servers. The centralized backup server, however, often has a limit for how many production servers it can back up efficiently. That is, each centralized backup server can effectively allocate only a certain amount of input/output and computing resources to a certain number of production servers until it starts to become saturated and inefficient. Thus, as an organization grows, it may find itself adding several centralized backup servers to balance the workload, so that each centralized backup server can manage a predetermined number of production servers as efficiently as possible. This, of course, can result in additional management costs for the organization.

In addition to the numbers of backup servers used, other difficulties can relate to how the backup servers are positioned on various points in the network. For example, an organization will often position the centralized backup server at a remote data center location, which may only be accessible over a Wide Area Network ("WAN"). This is often done to create a secure data storage center that is independent of events happening locally on the production server(s) Local Area Network ("LAN"). Placing the centralized backup server at a remote location, however, can have the added difficulty of reducing the accessibility of backup data, as well as the speed at which the backup data can be recovered in the event of a system crash. In particular, there are often significant bandwidth and processing constraints often associated with transferring an entire backup copy over a WAN. This inefficiency can be further exacerbated when the only available backup can be found on a tape drive backup of the centralized backup server itself.

For example, a distributed organization with a centralized data center and remote branch sites may be interested in producing tape backups of its production server data at the branch site. Since management of tape drives and libraries at the branch office may be problematic, the organization may decide to consolidate the tape drive archiving at the centralized data center. To do this, the organization might provide for a centralized backup server at the centralized data center, which could pull the production server data over the network, and then archive the production server data to tape. Unfortunately, when the corresponding production server(s) goes down at the branch office location, it can be difficult to recover this data from the tape archive at the central location. This is due at least in part to the notion that recovering the relevant data on the tape drive back to the branch from over the network will typically be slower than desired.

Accordingly, there are a number of difficulties in the infrastructure and methods used in conventional backup systems that can be addressed.

BRIEF SUMMARY

Implementations of the present invention solve one of more problems in the art with systems, methods, and computer program products configured to significantly simplify the backup of one or multiple production (e.g., file, mail, database, etc.) servers. In particular, implementations of the present invention include one or more lightweight, essentially stateless, storage node servers located relatively close in a network location to corresponding one or more production servers. As stateless entities, multiple storage node servers can be easily managed by a single centralized backup server. Furthermore, the geographic placement of the storage node servers allows them to provide relatively quick point-in-time, application-consistent backups of the one or more production servers when needed. Accordingly, an organization can easily backup large numbers of production servers through one or few centralized backup servers.

For example, a method from the perspective of a light-weight storage node for backing up data of at least one of the one or more production servers can involve receiving control settings from a centralized backup server. Generally, the control settings can be configured with sufficient code to instruct an assigned set of one or more production servers in accordance with a protection intent determined at the centralized backup server. As such, the method can also involve communicating the protection intent to the assigned one or more production servers.

In addition, the method can involve receiving an application-consistent snapshot of a data set from the production server. In such a case, the application-consistent snapshot represents a first point-in-time of a data backup at the production server. Similarly, the method can involve receiving an application-consistent snapshot of an update to the data set from the production server, where the application-consistent snapshot represents a second point-in-time of the data set. As such, the light-weight storage node stores the first point-intime and the second point-in-time snapshots of the data set from the production server in a storage volume.

In addition, a method from the perspective of the centralized backup server for administering one or more backup policies at the one or more production servers can involve identifying a first set of one or more production servers that have data to be protected. The method can also involve identifying one or more light-weight storage nodes. In general, the light-weight storage nodes will use control settings to implement a backup policy with a production server. As such, the method further involves determining control settings that include a protection intent for each of the one or more light-weight storage nodes. In such a case, the control settings also include an assignment of at least one of the one or more light-weight storage nodes to backup at least one of the one or more production servers in accordance with the protection intent. Upon determining and creating the customized control settings, the centralized backup server can then send the determined control settings to the one or more light-weight storage nodes.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to systems, methods, and computer program products configured to significantly simplify the backup of one or multiple production (e.g., file, mail, database, etc.) servers. In particular, implementations of the present invention include one or more lightweight, essentially stateless, storage node servers located relatively close in a network location to corresponding one or more production servers. As stateless entities, multiple storage node servers can be easily managed by a single centralized backup server. Furthermore, the geographic placement of the storage node servers allows them to provide relatively quick point-in-time, application-consistent backups of the one or more production servers when needed. Accordingly, an organization can easily backup large numbers of production servers through one or few centralized backup servers.

In particular, and as will be appreciated more fully from the following specification and claims, a centralized backup server (referred to herein as a Data Protection Manager server, or "DPM server") can readily implement a quick and efficient recovery solution to a very large number of production servers (e.g., file, mail, or database servers, or the like). This is possible at least in part since the actual data backup functions can be delegated to any number of virtually stateless, more locally positioned storage node servers. Thus, in one implementation, the centralized backup server can expend more effort determining what production server and backup resources are available in a given network, and how to allocate those resources to provide the most efficient data recovery possible.

In addition, implementations of the present invention provide backup solutions that can result in higher quality backups, which can ultimately result in much quicker production server recoveries. For example, each storage node in the backup system can be configured to receive and store application-consistent backups of production server data. These application-consistent backups can be taken from a production server without necessarily requiring the production server to first shut down. Furthermore, these application-consistent backups can be used to recover a failed production server to a desired point-in-time, in a manner that causes virtually no conflict with any particular application at the production server. Coupled with the notion that the production servers and storage nodes can be located geographically close together, or co-located on the same machine, implementations of the present invention provide a number of ways in which production servers can be quickly and efficiently restored to an appropriate point-in-time, and thus significantly reduce hindrances that would otherwise affect worker productivity.

Figure 1A:
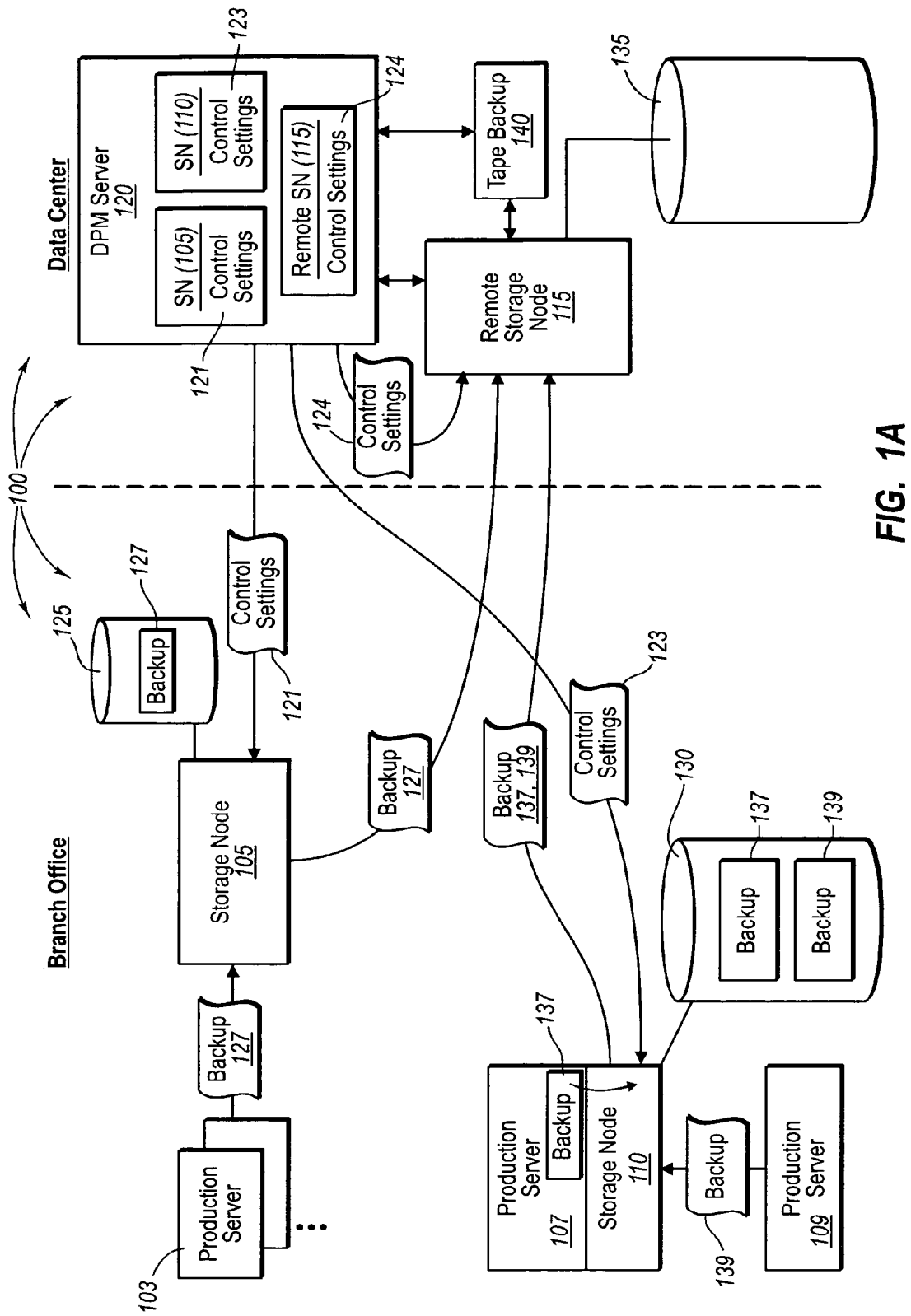
FIG. 1A illustrates an overview schematic diagram in accordance with an implementation of the present invention in which a centralized backup server implements a backup solution for a plurality of production servers through a plurality of light-weight storage nodes.

For example, FIG. 1A illustrates an overview of a backup system 100 in accordance with one or more implementations of the present invention. Generally, FIG. 1A illustrates backup system 100 as it may be distributed between two locations, such as a "branch office" and a "data center." In one implementation, the "branch office" location is one geographic locality, where server traffic may be directed over a LAN, while the "data center" is a different geographic locality, to and from which server traffic may be directed over a WAN. One will appreciate, however, that all data traffic between any given production server, storage node, and/or centralized backup server (e.g., "DPM server") may be directed exclusively over a WAN or LAN, as appropriate, or in some other distribution (not shown). Accordingly, the instant illustration is exemplary only.

In any event, FIG. 1A illustrates that backup system 100 comprises one or more production servers, such as production servers 103, 107, and 109. Each production server, in turn, connects to one or more other client computers (e.g., desktops, laptops, Personal Digital Assistants—PDAs, etc.) and/ or one or more other production servers (not shown). In general, the production servers hold data generated by the relevant client computer system that the relevant production server services.

FIG. 1A also illustrates that backup system 100 comprises a set of one or more local storage nodes 105, 110 located at the branch office, as well as remote storage node 115 located at the data center. One will appreciate that DPM server 120 can also be used to host a remote storage node, such as remote storage node 115. As shown, each storage node provides at least one level of abstraction between a given production server and DPM server 120. For example, storage node 105 interfaces between production server 103 and DPM server 120, while storage node 110, which in this case is part of the same machine as production server 107, also interfaces with production servers 107, 109 and DPM server 120. Remote storage node 115 (discussed more fully in the following text), in this case, can add yet another layer of abstraction by interfacing between storage nodes 105, 110 and DPM server 120. One will appreciate that an organization may add still other storage node layers (not shown) for still additional backup options, as appropriate.

FIG. 1A further shows that each storage node is also coupled to one or more backup volumes for storing a given production server data backup. For example, storage node 105 is connected to backup volume 125, while storage node 110 is connected to backup volume 130. In addition, remote storage node 115 is connected to backup volume 135 (as well as tape drive 140 via a LAN). In one implementation of the present invention, backup volumes 125, 130, and 135 are not necessarily attached to a specific storage node, but rather are accessible over a network, such as in the case of a Storage Area Network (or "SAN"). Nevertheless, and however configured, backup volumes 125, 130, and 135 can be any type of storage media, such as storage media connected by a SCSI, optical fiber, or iSCSI interface.

As previously mentioned, each of storage nodes 105, 110 and 115 can be described as a "light-weight" storage node. For the purposes of this specification and claims, the term "light-weight" refers to a computerized system that is effectively stateless, such that the system requires direction from an outside-provided agent (e.g., from DPM server 120) to perform certain backup operations effectively. In particular, a light-weight, or stateless system, as per one or more implementations of the present invention, is incapable of making backup administrative decisions unless supplied with a backup agent (i.e., "control settings") that receives control commands from a respective centralized backup server. Accordingly, FIG. 1A also illustrates a centralized backup server in the form of DPM server 120, which in this case is located at the data center. In general, DPM server 120 is configured to determine and provide control settings (i.e., backup agents—and any other necessary state and/or operating components) to each of the storage nodes in backup system 100.

In particular, DPM server 120 can store—as various control setting information—one or more applications or backup agents particularly tailored for the resources of (and production servers handled by) each storage node in backup system 100. For example, FIG. 1A shows that DPM server 120 manages control settings 121 for storage node 105, control settings 123 for storage node 110, and control settings 124 for remote storage node 115. Furthermore, FIG. 1A shows that DPM server 120 sends control settings 121 to storage node 105, control settings 123 to storage node 110, and control settings 124 to remote storage node 115. Each storage node receiving the relevant control settings, in turn, communicates with the corresponding production servers to receive one or more data backups in accordance with a particular schedule or setting determined by the control settings.

For example, control settings can cause a given storage node to monitor activity at a production server (e.g., 105), pass metrics of that activity to DPM 120, and set corresponding volume allocation information in an attached storage volume (e.g., 125). The control settings can also cause the storage node to initiate a backup (e.g., 127). For example, the control settings can cause the storage node to instruct the given production server to tell the relevant application writers at the production server that a backup is eminent, and make necessary preparations. The control settings can then cause the storage node to instruct the production server to begin making a backup of the data to be protected, and then send the backup to the storage node. Accordingly, FIG. 1A shows that storage node 105 receives and stores data backup 127 from production server 103, and that storage node 110 receives data backups 137 and 139 from production servers 107 and 109, respectively. Each of these backups 127, 137, 139 can be received at different times, on different schedules, and using any number of other methods deemed appropriate by DPM server 120.

As previously mentioned, the control settings can also cause the storage node to instruct the production server to send point-in-time updates of the relevant backup to the storage node. The production server can send these point-in-time updates as changed files, changed bytes, changed blocks (i.e., sets of bytes), or any combination thereof. Since the updates are typically much smaller than the original backup copy, the point-in-time updates can be transmitted relatively quickly over a LAN or WAN. This of course can vary in proportion to the frequency with which the storage node instructs the production server to send them. In any event, the relevant storage node can then combine these received updates with the original backup in accordance with its control settings, and create one or more point-in-time snapshots (i.e., application-consistent backups) of the entire production server volume (or any relevant partitions thereof).

As such, implementations of the present invention can provide much faster backup recoveries than previously available, at least in part since the given storage nodes can be positioned close to a given set of production servers (i.e., 103, 105), as well as exist on the same production server machine (i.e., 107, 110). As previously mentioned, this proximity can also mean that a given production server's backup can be recovered over a LAN, and from a much closer geographic positioned storage server than typical.

Nevertheless, and as previously mentioned, backup system 100 can include one or more additional fail-safes via one or more remote storage nodes (e.g., 115). Generally, remote storage node 115, as its name implies, may be positioned geographically distant from the storage nodes (e.g., 105, 110) near the production servers. Accordingly, FIG. 1A illustrates storage node 115 at the data center, where storage node 115 is connected to storage volume 135, and is in communication with storage nodes 105 and 110. Generally, storage node 115 is configured, via its control settings 124 received from DPM serve 120, to maintain at least a secondary copy of a backup maintained by one or more of the more local storage nodes. In some cases, remote storage node 115 keeps more recent data on disk (e.g., storage volume 135), and moves older data to tape (e.g., 140). Accordingly, FIG. 1A shows that storage nodes 105 and 110 send copies of their backups (i.e., 127, 137, 139) to remote storage node 115.

Although remote storage node 115 may receive copies of the backups over a WAN, which is slower for large data sets than a LAN in many cases, this will not likely create any network difficulties for the production server. For example, this communication will occur only between the local storage nodes 105, 110 and the remote storage node 115 in most cases. Furthermore, as with receiving a backup from a production server, remote storage node 115 will generally only need to receive a full copy of a given backup (e.g., 127) one time from the local storage nodes 105, 110, and thereafter receive only point-in-time (i.e., "application-consistent") updates to the given backup. Remote storage node 115, in turn, can then create multiple point-in-time, application-consistent backups of the data found at storage nodes 105 and 110, just as storage nodes 105 and 110 can do for production servers 103, 107, and 109.

In addition to backing up the local storage nodes 105, 110, remote storage node 115 can also provide backup functionality to DPM server 120. As previously mentioned, DPM server 120 does not actually have to perform backup functions (unless it is set up in place of remote storage node 115), but instead can simply provide detailed configuration and operation information for each storage node through customized control settings. In this particular case, therefore, backing up DPM server 120 simply involves backing up each of the different control settings for each given storage node, and any other state necessary to restore DPM server 120. It is not required that remote storage node 115 backup DPM server 120 at the same time as it receives backup copies from local storage nodes 105 and 110. That is, DPM server 120 may need to reconcile its state and control settings recovered from remote storage node 115 with the backups presently existing in backup system 100, during its own recovery.

In any event, remote storage node 115 can continually update what it is storing in storage volume 135, and pass older copies of data to tape drive 140. Accordingly, remote storage node 115 in this manner can provide a number of important fail-safe functions for all of the production server data in backup system 100. Furthermore, backing up the entire backup system 100 can be as simple as backing up storage node 115 and/or DPM server 120, rather than separately backing up each storage medium connected to each local storage node to a separate, locally connected tape archive (not shown).

Figure 1B:
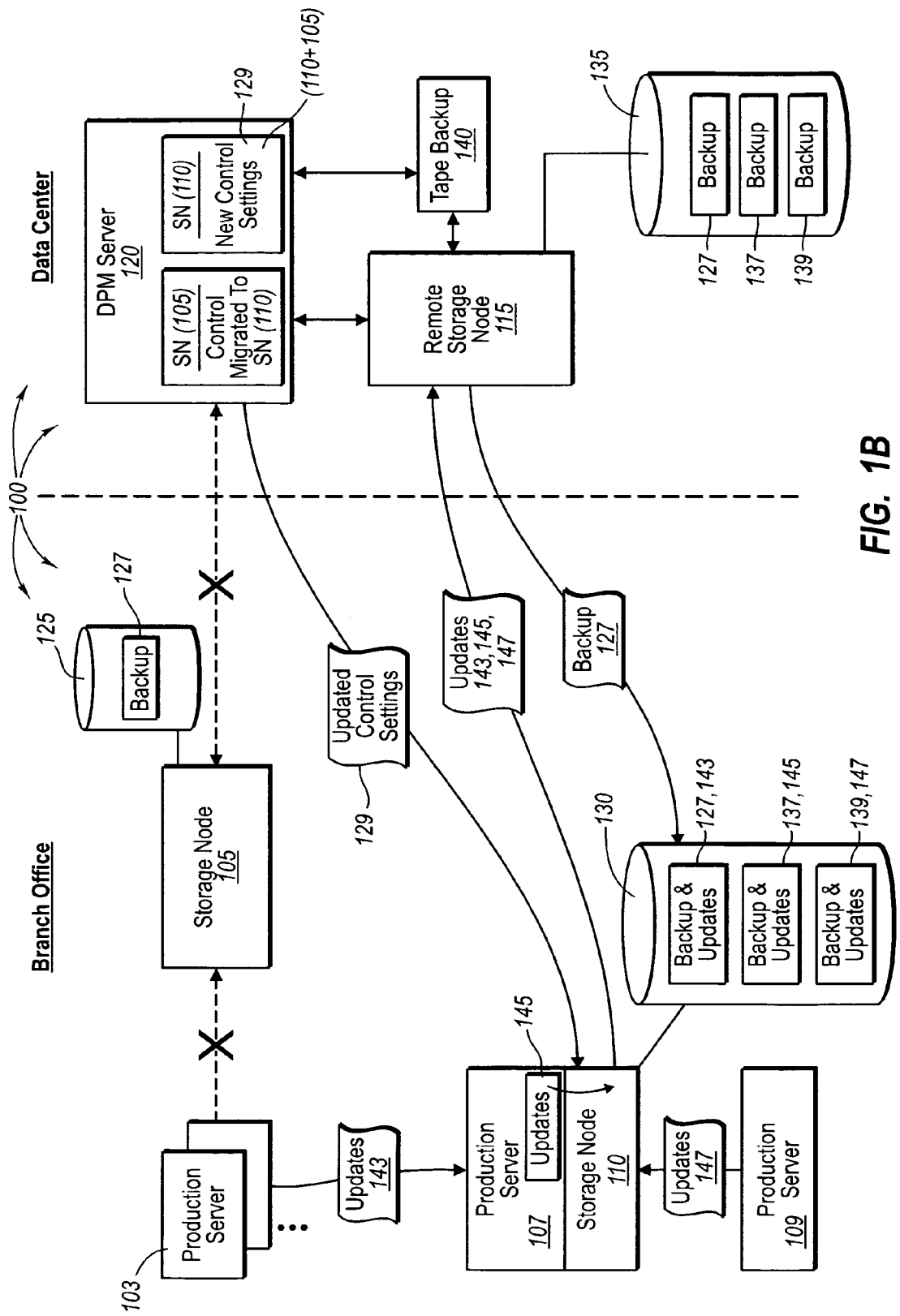
FIG. 1B illustrates the overview schematic diagram of FIG. 1A, in which the centralized backup server migrates backup functions from one storage node to another working storage node, in accordance with an implementation of the present invention.

FIG. 1B illustrates an implementation of the present invention in which backup management of one or more production servers is migrated from one local storage node to another in backup system 100. This migration can be precipitated by any number of factors or events, such as load balancing, network communication issues, failure events, some combination thereof, or the like. Accordingly, FIG. 1B shows that DPM server 120 halts communicating with storage node 105 in this particular example, such as by indicating to storage node 105 that control of production server 103 has been migrated to storage node 110. In such a case, a number of events can occur.

For example, the control settings at storage node 110 and at storage node 105 may already be configured with updated configuration information, such that storage node 110 immediately begins communicating with production server 103 when identifying an appropriate trigger (e.g., a signal from DPM server 120, identifying that storage node 105 has failed), and vice versa. Similarly, production server 103 may be configured to automatically begin sending backup information to storage node 110 in the event production server 103 detects a trigger to do so. For example, in the case of the controlled migration, if the backups and update log files (e.g., replica and shadow copies—not shown) deployed on storage node 105 can be reused, DPM server 120 can automatically associate them with the new storage node 130 (e.g., in a SAN deployment). Such an association could help avoid an "initial replication" process, which recreates the replica for the first time on the new storage node 110.

In this particular example, DPM server 120 creates a new set of control settings 129 for storage node 110. New control settings 129 are configured to instruct storage node 110 to start handling the load previously handled by storage node 105. As such, DPM server 120 sends these updated control settings 129 to storage node 110, and storage node 110 instructs production server 103 to start sending its backup updates 143 to storage node 110, rather than storage node 105. In the meantime, storage node 110 will need to access a copy of backup 127, which was previously being stored in volume 125. If volume 125 is part of a SAN, and assuming backup 127 is still valid as per the protection intent, then it is a relatively simple, automatic matter for storage node 110 to access backup 127. That is, storage node 110 can simply start passing updates 143 directly to the storage volume previously being accessed by storage node 105.

In the illustrated case, however, FIG. 1B shows that each storage node owns its own storage volume and that storage node 110 will need to get its own, new copy of backup 127 from the initial location (i.e., storage volume 125). In one implementation, an administrator at the branch office may simply disconnect (e.g., remove) storage volume 125 from storage node 105, and reconnect (e.g., attach) the storage volume with storage node 110. Nevertheless, if both storage node 105 and volume 125 are inaccessible for some reason, storage node 110 can simply retrieve backup 127 from remote storage node 115. For example, when the backup points-in-time become older than a time determined by the protection intent, the backup points-in-time may be deleted automatically.

Furthermore, the backup points-in-time can be deleted from the prior storage node once they are migrated to another storage node's storage volume (e.g., 130). The backup points-in-time can also be left on the prior storage node (and made accessible for recovery) until such time that the backup points-in-time become older than the protection intent, and, as such, are deleted. In cases such as these, the new storage volume (e.g., 115, or ultimately 130) to which protection is migrated might be the only location at which are stored the replica and backup points-in-time available. Accordingly, FIG. 1B shows that storage node 110 receives a copy of backup 127 directly from remote storage node 115, such as over a WAN, and thus stores backup 127 at storage volume 130.

At the same time, storage node 110 continues to receive updates 143 from production server 103, updates 145 from production server 107, and updates 147 from production server 109. Furthermore, storage node 110 passes these received updates 143, 145, and 147 to remote storage node 115, and combines these updates in storage volume 130 with their corresponding original backups to create one or more application-consistent point-in-time snapshots of production server data. Thus, even though the duties handled by storage node 105 have been migrated to storage node 110, production server 103 can still be restored in the event of failure with an application-consistent, point-in-time backup of its data for storage node 110. The foregoing example, of course, is also applicable in the alternate event in which storage node 105 remains active, but storage node 110 fails. The control settings for storage node 105 would simply be updated by DPM server 120, and storage node 105 would begin storing backups and relevant updates for production servers 107 and 109, as needed. One will appreciate, therefore, that not just one production server (e.g., 103), but all production servers at the branch office can be restored in the event of an "entire site disaster," at least in part since backups stored by each storage node are also passed along to remote storage node 115.

In particular, in the rare event that all local storage nodes (e.g., 105 and 110) fail at the same time, and in the event that a given production server also happens to need to be restored to a specific point in time, implementations of the present invention can still allow each given production server to be restored. Specifically, a given production server may be restored by accessing its backup and any stored updates from remote storage node 115. While the data in this case may be transmitted over less efficient means (i.e., a WAN between the data center) than otherwise available from a geographically close LAN-connected server, the given production server can still be recovered to one or more points-in-time. As before, DPM server 120 can simply update the control settings (if necessary) for remote storage node 115, such that remote storage node 115 starts receiving backup updates directly from production servers 103, 107, and 109. Similarly, the production server that needs to recover its data can simply contact remote storage node 115 directly, and begin receiving data back to an available point-in-time.

Thus, a given local storage node (e.g., 105, 110) can enable near instantaneous recovery for an assigned production server. Furthermore, this recovery can be done without necessarily requiring a separate tape drive to be collocated with each given storage node. In particular, data can be replicated from a local storage node (e.g., 105, 110) to a remote storage node (e.g., 115), and then stored at a remote tape drive (e.g., 140) at a data center. A data transfer that is optimized in this manner between the local and remote storage nodes can ensure that full tape backups can be performed off the remote storage node without ever having to send an entire data set over, for example, a WAN.

Accordingly, one can appreciate that, by providing the ability to replicate from a local storage node (e.g., 105, 110) to a remote storage node (e.g., 115), a production server, or backup administrator can use remote storage node 115 to support the archival needs of the entire system 100. For example, and as previously mentioned above, a SAN (though not required) can be deployed in one implementation to effectively partition the tape library (e.g., 140), and make the tape library appear like a local resource for all servers wishing to share the tape library. In particular, several remote storage nodes (e.g., 115, and/or others not shown) at the data center could be configured to use partitions of the same tape library 140. Such an arrangement can remove any perceived need to have individual tape libraries collocated with the lightweight, local storage nodes (e.g., 105, 110). As such, an organization can buy and manage a single tape library and then use it efficiently to service a large number of production servers and local storage nodes.

Figure 1C:
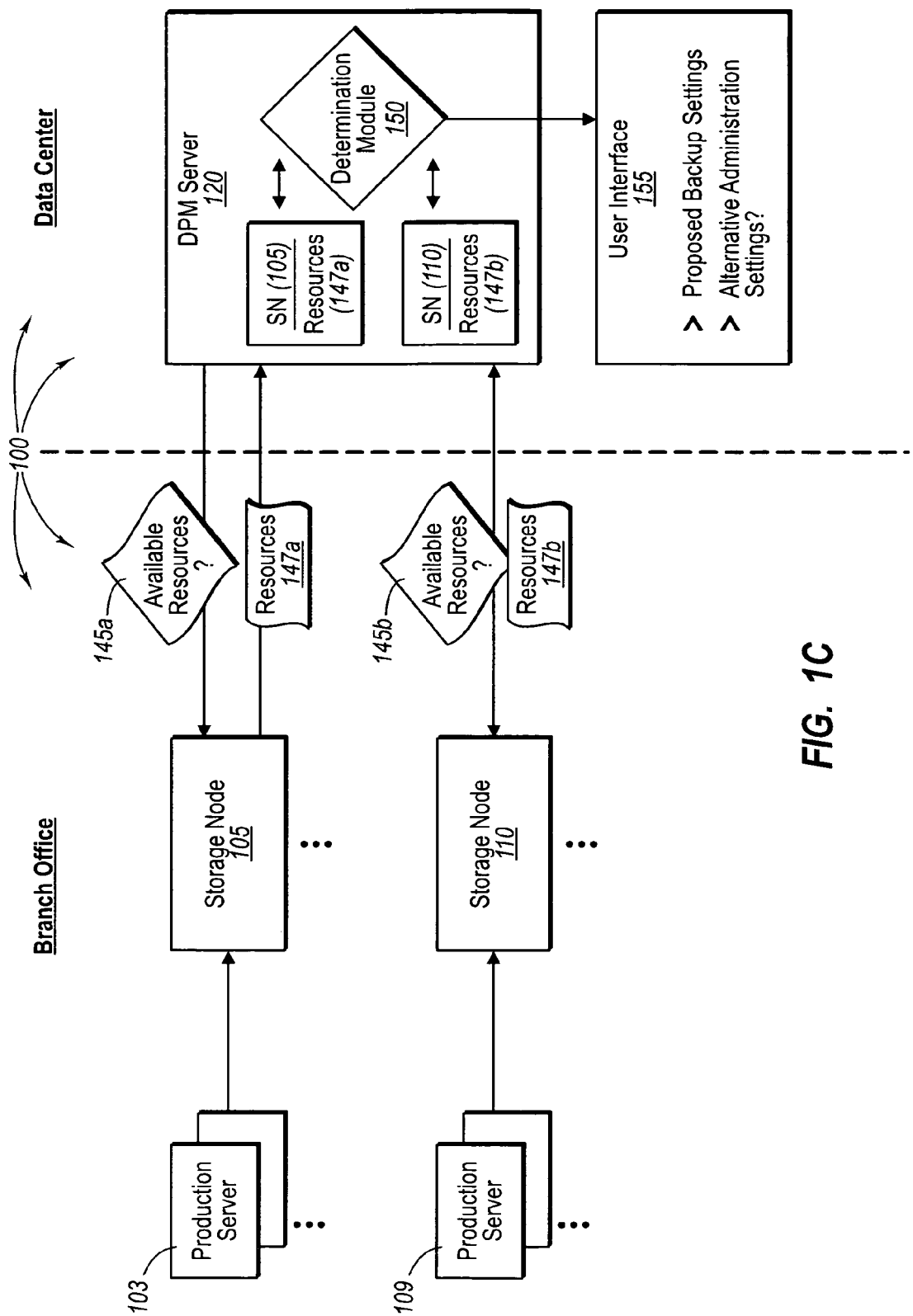
FIG. 1C illustrates an overview of the system shown in FIGS. 1A-1B, in which the centralized backup server determines an appropriate backup strategy based in part on identifying presently available resources, as well as receiving input from a backup administrator, in accordance with an implementation of the present invention.

Referring again to the figures, the ability to migrate responsibilities from one storage node to another suggests that there may be many instances in which control setting information may need to be changed or updated at the DPM server 120. Accordingly, FIG. 1C illustrates an implementation in which DPM server 120 is used to determine how to allocate storage node resources, and how to implement one or more backup solutions within system 100. In particular, DPM server 120 can be configured not only to automatically implement an appropriate backup solution, but also to create an "intent-driven" backup solution provided by an administrator. For example, FIG. 1C shows that DPM server 120 sends out one or more queries 145a-b for available resources in backup system 100. DPM server 120 then passes the responses 147a-b through a determination module 150, wherein DPM server 120 identifies, for example, what storage nodes should be servicing what production servers, and how often those storage nodes should be backing up such production servers. These determinations can also be presented to—and modified by—a backup administrator, such as a DPM server 120 administrator at the data center.

Thus, for example, FIG. 1C shows that DPM server 120 can present the administrator with user interface 155. In an implementation such as illustrated, user interface 155 can suggest one or more default backup topologies and solutions for system 100. Interface 155 can also provide one or more input features, to allow the administrator to adjust the solutions generated by DPM server 120. These inputs can then be passed to Determination Module 150, and then used to modify relevant control settings, and sent out to the corresponding storage nodes. As such, implementations of the present invention can provide the backup administrator with several configurability options for making sure that storage nodes in system 100 meet certain goals and intents not otherwise automatically proposed by determination module 150.

In one implementation, the actual creation of the backup jobs and storage node selection can be achieved as described in more detail below. In particular, DPM server 120 can determine the scheduling of jobs to meet the intents received via interface 155 from the DPM administrator. (Notably, the DPM server 120 may not need to perform an analysis of available link bandwidth and storage node disk throughputs to select storage nodes to be used in the backup process.) In any event, the intent received from the DPM administrator could be as outlined:

1. Data loss tolerance of no more than 30 minutes for backups, and recovery of data up to 5 days old with rapid recovery time goals.
2. Data loss tolerance of no more than 8 hours in the case of disasters, and recovery of data up to 48 hours if required.
3. Archive data once a week, on Sundays, at 9 am.

In this example, DPM server 120 could look up its list of storage nodes (i.e. via queries 145a-b, etc.) and identify all the storage nodes that have the appropriate resources. In particular, DPM server 120 can identify all the storage nodes with appropriate and available storage volume space, and/or attached one or more tape libraries. Once DPM server 120 has identified the possible set of storage nodes based on the criteria above, it could then enumerate the identified storage nodes to the DPM administrator (e.g., via user interface 155) and request the admin to select the appropriate storage nodes (e.g., as shown). Thus, for example, DPM server 120 could indicate the following to the DPM administrator through interface 155.

1. For the 30 minute data loss for backups, DPM could propose either of the following:
    a. Select a storage node (e.g., 105) that is located close to or with at least some geographical proximity to a given production server (e.g., 103).
    b. Select a production server (e.g., 107) that has the data to be protected itself as also being the storage node (e.g., 110), assuming it has the appropriate resources.
2. For the 8 hours of data loss in case of disasters, DPM server 120 might recommend selecting a storage node (e.g., remote storage node 115) that is not collocated with a given production server (e.g., 103) that has the data to be protected.

3. For the archive intent, DPM server 120 could use remote storage node 115 as long as it has an attached tape library (e.g., 140). Alternately, the remote storage node 115 could be a third storage node that the admin selects from the list enumerated by DPM server 120 (i.e., a list containing the storage nodes that have the required resources to meet this intent).

Once the storage nodes are selected and configured, DPM server 120 could schedule the replication, shadow copy and archive jobs based on the specified intents as described in the chart below.

| Job type | Job schedule | Description |
|---|---|---|
| Replication | Runs every 30 minutes | Replicates data from the production server with the data to be protected to the storage node identified by the DPM administrator. |
| Shadow copy (for backups) | Runs periodically (see description for the periodicity) | The periodicity of the shadow copy creation on the local storage node can depend on the design approach followed to replicate. For example, if shipping application logs, then it may not be necessary to create shadow copies unless a full backup is performed for the application, and changes are also replicated to the storage node. If replicating a file server, however, a shadow copy could be scheduled for whenever the DPM administrator wants a recoverable point-in-time. |
| Storage node-storage node replication (for disaster recovery) | Runs every 8 hours | Replicates data from the storage node collocated with the production server that has protected data, and also from the remotely located storage node identified by the DPM administrator. |
| Shadow copy (for disaster recovery) | Runs every 8 hours | Creates a point-in-time backup on the remote storage node, which can be used in case of disasters. |
| Archive | Runs every Sunday at 9am | Archives off the remote storage node. |

As previously noted, DPM server 120 may gather and administer the above information, whether that information is gathered without knowledge of the available bandwidth and network topology between the storage nodes, or with knowledge of bandwidth and topology between the storage nodes and the corresponding production servers. Accordingly, DPM server 120 can function primarily in one implementation simply by scheduling jobs, and recommending potential storage nodes to use.

In addition to proposing one or more backup solutions, and administering an intent received from a DPM administrator, DPM server 120 can also be configured to monitor the backup, disaster and archive processes, in order to see if the DPM administrator's intents are being met. The following text outlines some example problems that might be identified, as well as some possible solutions to these identified problems.

Insufficient disk space on storage node: recommend that the DPM administrator add more storage disks, or migrate data to a local storage node that has the appropriate disk space available (DPM can recommend a set of potential local storage nodes if the DPM administrator wishes to migrate data);

Bandwidth constrains data transmissions: recommend that the DPM administrator migrate the protection to another storage node, such as a storage node that is either more closely located on the network to the production server, or that is accessible via a faster network connection. In such a case, of course DPM server 120 would be configured to identify information about the bandwidth between the production server to be protected and the relevant storage nodes;

Failure of the archival process: notify the DPM administrator that the offsite protection intent is not being met, and then recommend appropriate corrective actions. Ultimately, if there is failure to meet the intents (under this or any of the other scenarios outlined herein), DPM server 120 can be configured alert the DPM administrator, and provide a recommended set of steps to overcome the problem.

Figure 2:
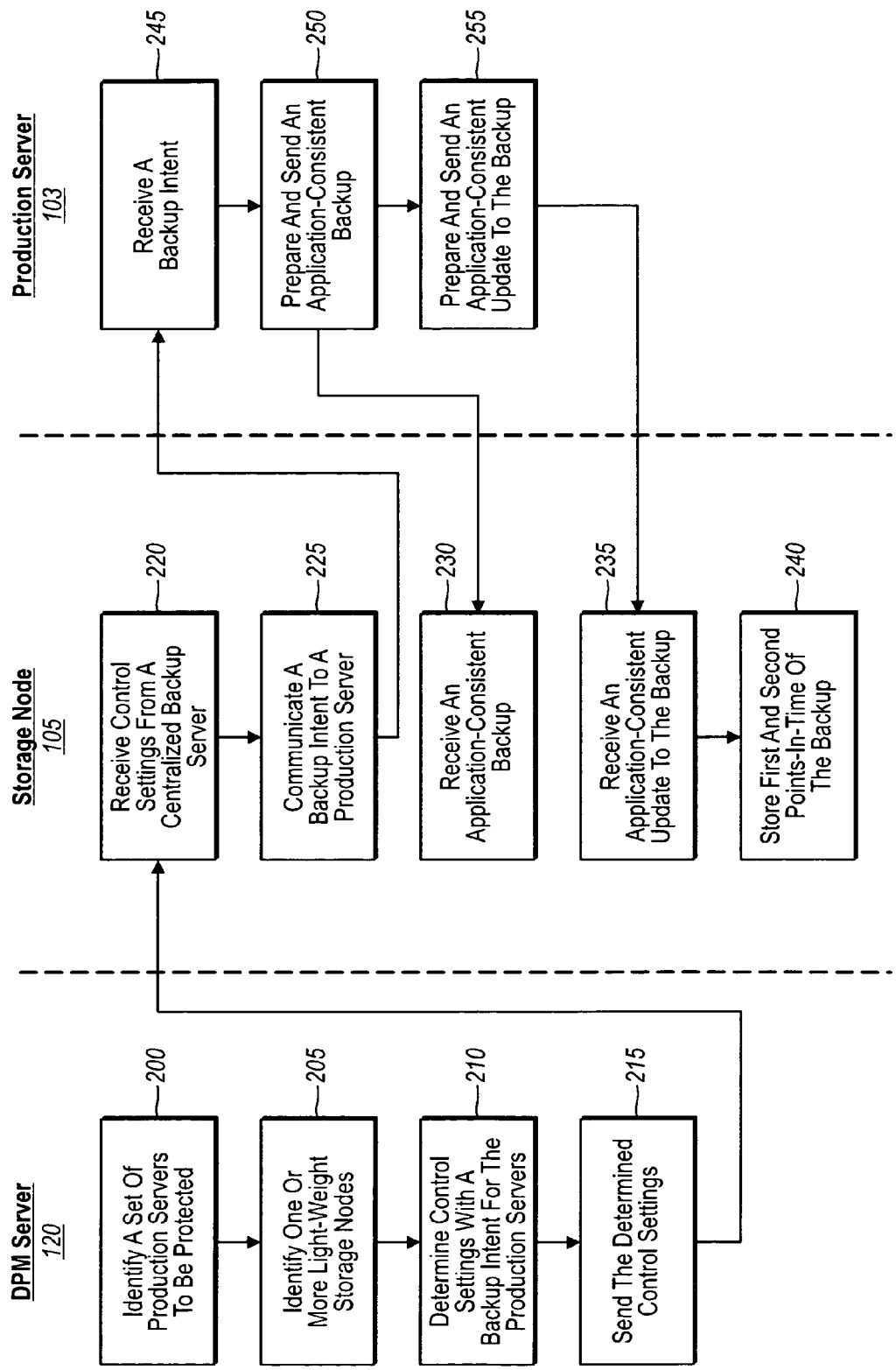
FIG. 2 illustrates flowcharts of methods in accordance with an implementation of the present invention from the perspective of a DPM server, a storage node, and an exemplary production server for implementing one or more backup solutions.

FIGS. 1A-1C, and the corresponding description, therefore, illustrate and describe a number of systems, topologies, and generalized mechanisms for implementing one or more backup solutions in accordance with aspects of the present invention. The present invention can also be described in terms of methods comprising a set of one or more acts for accomplishing a particular, desired result. In particular, FIG. 2 illustrates a flowchart of a series of acts form the perspective of a centralized backup server (i.e., "DPM server 120"), of a light weight storage node (i.e., "storage node 105"), and of a production server (i.e., "Production Server 103") for implementing a determined backup solution. The acts of these flowcharts are described below with particular reference to the part numbers illustrated in FIGS. 1A-1C.

For example, FIG. 2 shows that a method in accordance with at least one implementation of the present invention from the perspective of DPM server 120 for implementing a back solution comprises an act 200 of identifying a set of production servers to be protected. Act 200 includes identifying a first set of one or more production servers having data to be protected. For example, DPM server 120 sends out a query (not shown) of all available production servers (e.g., 103, 107, 109, etc.) in system 100, and identifies such criteria as write rate, network and geographical positioning at a branch office, and so forth. This query may be sent out automatically as part of a periodic check on the system, but can also be sent in response to instructions received from a DPM administrator through an appropriate interface.

In addition, FIG. 2 shows that the method from the perspective of DPM server 120 comprises an act 205 of identifying one or more light-weight storage nodes. Act 205 includes identifying one or more light-weight storage nodes, wherein the light-weight storage nodes use control settings to implement a backup policy with a production server. For example, as part of a response to the one or more queries previously sent to gauge system 100, or as part of a different query for available resources (e.g., 145*a-b*, FIG. 1C), DPM server 120 receives one or more responses (e.g., 147*a-b*, FIG. 1C) in which it identifies storage nodes 105 and 110 at a branch office, storage node 115 at a data center, and corresponding available resources for each of the identified storage nodes. From information such as this, DPM server 120 can formulate control settings and backup policies for each of the identified servers.

Accordingly, FIG. 2 shows that the method also comprises an act 210 of determining control settings with a protection intent for the production servers. Act 210 includes determining control settings having a protection intent for each of the one or more light-weight storage nodes, wherein the control settings include an assignment of at least one of the one or more light-weight storage nodes to backup at least one of the one or more production servers in accordance with the protection intent. For example, DPM server 120 determines that light-weight storage node 105 should be assigned to backup at least production server 103, and that light-weight storage node 110 should be assigned to backup at least production servers 107 (which is also part of the same machine as storage node 110) and production server 109.

This determination may be based on any number of factors, such as data redundancy requirements (such as the number of points-in-time desired by the organization), geographic and network proximity, network bandwidth/throughput, and so forth pursuant to making data recovery for each production server as quick and efficient as possible. DPM server 120 also, therefore, determines an appropriate backup policy for each of the production servers based on these same factors, as well as various write and read rates, available storage in volumes 125, 130, and 135, and so on. Each such determination can be combined into a set of control settings for each storage node (i.e., control settings 121 for storage node 105, control settings 123 for storage node 110, and control settings 124 for remote storage node 115). As previously described, these determined control settings include one or more applications, appropriate state for each storage node, and any other instructions or metadata needed to cause each storage node to implement a protection intent at the assigned one or more production servers. Upon determining the control settings for each storage node, DPM server 120 can then send these control settings as appropriate to each storage node.

Accordingly, FIG. 2 further shows that the method from the perspective of DPM server 120 comprises an act 215 of sending the determined control settings. Act 215 includes sending the determined control settings to the one or more light-weight storage nodes. For example, as shown in FIG. 1A, DPM server 120 sends control settings 121 to storage node 105, control settings 123 to storage node 110, and control settings 124 to remote storage node 115. As such, much of the storage server management in system 100 can be performed primarily at DPM server 120, rather than at each given storage node in system 100. Furthermore, if these control settings ever need to be updated for any reason, it can be a relatively simple matter to update these control settings at DPM server 120, and then send these control settings out again, as appropriate, to each storage node.

Thus, FIG. 2 shows that the method from the perspective of storage node 105 comprises an act 220 of receiving control settings from a centralized backup server. Act 220 includes receiving control settings from a centralized backup server, the control settings configured to instruct an assigned set of one or more production servers in accordance with a protection intent. For example, as shown in FIGS. 1A-1B, storage node 105 receives control settings 121 directly from DPM server 120. Similarly, storage nodes 110 and 115 each receive corresponding control settings 123 and 124 directly from DPM server 120. Beyond simply receiving these control settings, each such storage node will then need to execute and implement the control settings as appropriate. This includes identifying an assignment of production servers found in the control settings, as well as sending an identified protection intent to the assigned production servers.

Accordingly, FIG. 2 further shows that the method from the perspective of storage node 105 can comprise an act 225 of communicating a protection intent to a production server. Act 225 includes communicating the protection intent to the assigned one or more production servers. For example, and as previously mentioned, storage node 105 sends a protection intent (not shown) to production server 103, so that the production server can identify which backup policies to implement, and how to implement them.

As such, FIG. 2 shows that the method from the perspective of production server 103 comprises an act 245 of receiving a protection intent. Act 245 includes receiving a protection intent from a storage node, the protection intent including a set of one or more backup agents and backup policies used to implement a backup solution determined through DPM server 120. For example, production server 103 receives a protection intent from storage node 105, and production servers 107 and 109 received a different protection intent from storage node 110. Each protection intent may be specifically tailored for locations, resources, and other operations unique to the given production server. For example, a protection intent implemented by storage node 105 (or DPM server 120) for production server 103 may require production server 103 to generate an application-consistent backup (e.g., 127) of its data once every 30 minutes and send it to storage node 105. By contrast, a protection intent implemented by storage node 110 (or DPM server 120) for production server 107 may require production server 107 to send an application-consistent backup (e.g., 138) to storage node 110 every 8 hours.

In addition, FIG. 2 shows that the method from the perspective of production server 103 comprises an act 250 of preparing and sending an application-consistent backup. Act 250 includes preparing an application-consistent snapshot of data to be protected at the production server, and sending that application-consistent snapshot to the assigned storage node. For example, at the appropriate time, the received backup agent executes at the production server 103, and tells the relevant application writers at the production server to begin making preparations for a data backup.

The production server begins copying the data to be protected to an available storage resource, such as to a physical storage volume (not shown), an in-memory bitmap, or the like. Upon copying the data to be protected, the production server sends an initial copy of the data (i.e., backup 127) to storage node 105 at the same time that the production server records additional writes (i.e., updates) to the data. In one implementation, production server can make all of these backup copies without necessarily shutting down, thus preserving work time for connected client systems.

Accordingly, FIG. 2 shows that the method from the perspective of storage node 105 comprises an act 230 of receiving an application-consistent backup. Act 230 includes receiving an application-consistent snapshot of a data set from the production server, wherein the application-consistent snapshot represents a first point-in-time. For example, at least in part because the production server made its initial backup copy (e.g., 127) by synchronizing its backup instructions through the relevant application writers, the backup received by storage node 105 is application-consistent. As previously mentioned, the means that all the data and corresponding state in the received backup are valid for the same point in time.

In addition, FIG. 2 shows that the method from the perspective of production server 103 comprises an act 255 of preparing and sending an application-consistent update to the backup. Act 255 includes preparing an application-consistent snapshot of updates to the data to be protected at the production server, and sending that application-consistent updated snapshot to the assigned storage node. For example, at the appropriate time, the received backup agent executes at the production server 103, and tells the relevant application writers at the production server to begin making preparations for a new data backup. The production server then identifies all of the changes to the data and state of the prior backup, again for a single point in time for all relevant applications. The created updates (e.g., 143, 147) are thus valid for all of the protected data and corresponding state for the same point in time.

Accordingly, FIG. 2 shows that the method from the perspective of storage node 105 comprises an act 235 of receiving an application-consistent update to the backup. Act 235 includes receiving an application-consistent snapshot of an update to the data set from the production server, wherein the application-consistent snapshot represents a second point-in-time of the data set. For example, FIG. 1B shows that storage node 110 receives updates 145 from production server 107 and updates 147 from production server 109.

Furthermore, the method from the perspective of storage node 105 comprises an act 240 of storing first and second points-in-time of the backup. Act 240 includes storing the first point-in-time and the second point-in-time snapshots of the data set from the production server in a storage volume. For example, FIG. 1B shows that storage node 110 stores a backup and corresponding updates (e.g., 137, 145) for production server 107, as well as a backup and corresponding updates (e.g., 139, 147) for production server 109, in storage volume 130. These backups and corresponding updates represent discrete points in time, such as iterative differences of 30 minutes, 8 hours, several days, or the like, as set by the corresponding backup policy from DPM server 120.

As such, the methods described with respect to FIG. 2 illustrate how each component or tier in backup system 100 can operate with respect to acts that are unique in its own context (i.e., storage node alone), as well as unique in the context of one or more other tiers (i.e., production server and storage node, storage node and centralized backup server, or production server, storage node, and centralized backup server). One will appreciate, therefore, that implementations of the present invention are therefore unique from a variety of instructional (e.g., control settings), as well as infrastructural contexts (e.g., arrangement of tiers).

In particular, and in addition to the method and general system descriptions, implementations of the present invention can further be described in terms of unique topologies that comprise a first tier of one or more production servers, a next tier of one or more light-weight storage nodes assigned to a portion or all of the one or more production servers, and a further tier of one or more remote storage nodes and a centralized backup server. As previously described, such a unique topology can be further varied in terms of differential geographical positioning of storage nodes and production servers to achieve the most efficient data recovery, as well as differential geographic positioning of storage nodes to provide additional fail-safes to the backup system, and even additional tiers of still other storage nodes (not shown).

Accordingly, FIGS. 1A-1C and 2, and the corresponding text, provide and suggest a number of topologies, frameworks, components, and mechanisms for implementing an efficient backup policy in a system. In particular, these components and frameworks provide client systems, as well as their connected production servers, with a variety of mechanisms and corresponding fail-safes that enable rapid, application-consistent data recovery, while at the same time minimizing any reductions in productivity that otherwise occur in a conventional backup system.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a light-weight storage node server of a computerized environment that includes one or more production servers and a centralized backup server configured to administer backup solutions of data at the one or more production servers, a method of backing up data of at least one of the one or more production servers in accordance with instructions received from the centralized backup server, comprising the acts of:

receiving control settings at a light-weight storage node server from a centralized backup server, the control settings configured to instruct an assigned set of one or more production servers in accordance with a protection intent, wherein the centralized backup server stores control settings for each of one or more light-weight storage node servers but does not store backup data from the one or more production servers;

the light-weight storage node server communicating the protection intent to the assigned one or more production servers, wherein the protection intent instructs each of the assigned one or more production servers to create backups at a specified interval;

receiving an application-consistent snapshot of a data set from the production server, wherein the application-consistent snapshot represents a first point-in-time;

receiving an application-consistent snapshot of an update to the data set from the production server, wherein the application-consistent snapshot represents a second point-in-time of the data set; and storing at least the first point-in-time and the second point-in-time snapshots of the data set from the production server in a storage volume of the light-weight storage node server such that the snapshots are stored on the storage node server rather than on the centralized backup server.

2. The method as recited in claim 1, further comprising an act of, upon request from a remote storage node, sending the first point-in-time backup to the remote storage node located at a remote data center.

3. The method as recited in claim 2, wherein the light-weight storage node is collocated with the assigned one or more production servers at a branch office, and wherein the centralized backup server and the remote storage node are located in a geographically remote location.

4. The method as recited in claim 2, further comprising an act of sending the second point-in-time update to the remote storage node.

5. The method as recited in claim 2, further comprising an act of receiving a set of new control settings from the centralized backup server, the new control settings changing the assignment of production servers to include one or more different production servers, wherein the new control settings further include a different protection intent to be used with the different one or more production servers.

6. The method as recited in claim 5, further comprising an act of communicating the different protection intent to the different one or more production servers.

7. The method as recited in claim 6, further comprising an act of receiving from the remote storage node a different point-in-time backup for the different one or more production servers.

8. The method as recited in claim 6, further comprising an act of connecting to a different storage volume on which is stored the different point-in-time backup for the different one or more production servers.

9. The method as recited in claim 8, further comprising the acts of:

receiving a different point-in-time update from the different one or more production servers; and passing the different point-in-time update to the connected different storage volume, such that the different storage volume stores at least two point-in-time snapshots of data on the different one or more production servers.

10. The method as recited in claim 8, wherein the different storage volume is one of:

(i) a removable storage drive, wherein the removable storage drive is removed from a different storage node previously servicing the different one or more storage nodes and attached to the light-weight storage node; or (ii) a storage volume hosted by any of the different storage node or a storage server, and accessed through a network connection.

11. At a centralized backup server of a computerized environment that includes one or more production servers and one or more light-weight storage nodes configured to administer backup solutions of data at the one or more production servers, a method of administering one or more backup policies at the one or more production servers through the one or more light-weight storage nodes, the method comprising the acts:

identifying a first set of one or more production servers having data to be protected;

identifying one or more light-weight storage nodes, wherein the light-weight storage nodes require control settings to implement a backup policy with a production server;

determining control settings having a protection intent for each of the one or more light-weight storage nodes, wherein the control settings include an assignment of at least one of the one or more light-weight storage nodes to backup at least one of the one or more production servers in accordance with the protection intent; and sending the determined control settings to the one or more light-weight storage nodes such that the one or more light-weight storage nodes provide the protection intent to the assigned one or more production servers and in response the one or more production servers provide backup data to be stored on the one or more light-weight storage nodes rather than to be stored on the centralized backup server.

12. The method as recited in claim 11, further comprising the acts of generating a set of new control settings for a second storage node of the one or more light-weight storage nodes, the new control settings indicating that a second storage node is to provide backup services to the first set of one or more production servers; and sending the set of new control settings to the second storage node.

13. The method as recited in claim 12, wherein the new set of control settings are generated in response to identifying that a first storage node of the one or more light-weight storage nodes that is assigned to a first set of one or more production servers has failed.

14. The method as recited in claim 12, wherein the new set of control settings are generated in response to input received through a user interface to assign the second storage node to the first set of one or more production servers.

15. The method as recited in claim 11, further comprising an act of querying each of the one or more production servers and one or more light-weight storage nodes to determine available resources.

16. The method as recited in claim 15, further comprising an act of automatically determining a proposed assignment of light-weight storage nodes and production servers, such that at least one of the one or more light-weight storage nodes is collocated with at least one of the one or more production servers at a branch office.

17. The method as recited in claim 16, further comprising an act of determining the proposed assignment based on a load balancing concern for a plurality of the light-weight storage nodes.

18. The method as recited in claim 11, further comprising an act of sending all control settings for each of the one or more light-weight storage nodes, and any corresponding state and metadata to a remote storage node that is collocated with the centralized backup server.

19. The method as recited in claim 18, further comprising the acts of:

recovering the control settings, and any corresponding state and metadata from the remote storage node; and reconciling a current state for each of the light-weight storage nodes with the control settings, and any corresponding state and metadata recovered from the remote storage node.

20. At a centralized backup server of a computerized environment that includes one or more production servers and one or more light-weight storage nodes configured to administer backup solutions of data at the one or more production servers, a computer program product having computer-executable code stored thereon that, when executed, causes one or more processors at the centralized backup server to perform a method of administering one or more backup policies at the one or more production servers through the one or more light-weight storage nodes, the method comprising the following:

identifying a first set of one or more production servers having data to be protected;

identifying one or more light-weight storage nodes, wherein the light-weight storage nodes require control settings to implement a backup policy with a production server;

determining control settings having a protection intent for each of the one or more light-weight storage nodes, wherein the control settings include an assignment of at least one of the one or more light-weight storage nodes to backup at least one of the one or more production servers in accordance with the protection intent; and sending the determined control settings to the one or more light-weight storage nodes such that the one or more light-weight storage nodes provide the protection intent to the assigned one or more production servers and in response the one or more production servers provide backup data to be stored on the one or more light-weight storage nodes rather than to be stored on the centralized backup server.

* * * * *